(12) United States Patent
Ng et al.

(10) Patent No.: US 10,780,497 B2
(45) Date of Patent: Sep. 22, 2020

(54) MATERIAL DISPENSING AND COMPACTION IN ADDITIVE MANUFACTURING

(71) Applicant: Applied Materials, Inc., Santa Clara, CA (US)

(72) Inventors: Hou T. Ng, Campbell, CA (US); Nag B. Patibandla, Pleasanton, CA (US); Ajey M. Joshi, San Jose, CA (US); Ashavani Kumar, Sunnyvale, CA (US); Kasiraman Krishnan, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 972 days.

(21) Appl. No.: 15/186,060

(22) Filed: Jun. 17, 2016

(65) Prior Publication Data

US 2016/0368054 A1 Dec. 22, 2016

Related U.S. Application Data

(60) Provisional application No. 62/182,344, filed on Jun. 19, 2015.

(51) Int. Cl.
*B22F 3/105* (2006.01)
*B33Y 30/00* (2015.01)
(Continued)

(52) U.S. Cl.
CPC .......... *B22F 3/1055* (2013.01); *B29C 64/153* (2017.08); *B29C 64/20* (2017.08);
(Continued)

(58) Field of Classification Search
CPC ............ B22F 3/1055; B22F 2003/1056; B22F 2003/1057; B29C 64/153; B29C 64/336; B29C 64/141; B29C 64/218; B29C 64/343
See application file for complete search history.

(56) References Cited

U.S. PATENT DOCUMENTS

| | | | | |
|---|---|---|---|---|
| 3,567,120 A | * | 3/1971 | Suda ...................... | A01C 15/04 239/152 |
| 5,555,481 A | * | 9/1996 | Rock ....................... | B22F 3/008 29/239 |

(Continued)

FOREIGN PATENT DOCUMENTS

| | | |
|---|---|---|
| CN | 202317020 | 7/2012 |
| CN | 103802317 | 5/2014 |

(Continued)

OTHER PUBLICATIONS

Machine Translation of JP 2000328106A, 11 pages. (Year: 2019).*

(Continued)

*Primary Examiner* — Xiao S Zhao
*Assistant Examiner* — Emmanuel S Luk
(74) *Attorney, Agent, or Firm* — Fish & Richardson P.C.

(57) ABSTRACT

An additive manufacturing apparatus for forming a part includes a support, a first dispenser to deliver a layer of first particles on a support or an underlying layer on the support, a second dispenser to deliver second particles onto the layer of first particles such that the second particles infiltrate into the layer of first particles, an energy source to fuse the first particle and second particles to form a fused layer of the part, and a controller coupled to the first dispenser, second dispenser and energy source.

15 Claims, 10 Drawing Sheets

(51) Int. Cl.
    *B33Y 50/02*               (2015.01)
    *B33Y 10/00*              (2015.01)
    *B29C 64/386*           (2017.01)
    *B29C 64/153*           (2017.01)
    *B29C 64/20*              (2017.01)
    *B22F 1/00*               (2006.01)

(52) U.S. Cl.
    CPC ............ *B29C 64/386* (2017.08); *B33Y 10/00* (2014.12); *B33Y 30/00* (2014.12); *B33Y 50/02* (2014.12); *B22F 1/0014* (2013.01); *B22F 2003/1056* (2013.01); *B22F 2003/1057* (2013.01); *B22F 2207/17* (2013.01); *Y02P 10/295* (2015.11)

(56) References Cited

U.S. PATENT DOCUMENTS

| | | | | |
|---|---|---|---|---|
| 5,997,795 A * | 12/1999 | Danforth | ............ | B29C 33/3842 264/219 |
| 6,007,318 A * | 12/1999 | Russell | ............ | B29C 41/12 425/130 |
| 6,007,764 A | 12/1999 | Benda et al. | | |
| 6,391,251 B1 | 5/2002 | Keicher et al. | | |
| 6,405,095 B1 * | 6/2002 | Jang | ............ | G05B 19/4099 264/308 |
| 6,814,926 B2 | 11/2004 | Geving et al. | | |
| 7,389,154 B2 | 6/2008 | Hunter et al. | | |
| 7,509,240 B2 * | 3/2009 | Das | ............ | B33Y 30/00 264/16 |
| 7,836,572 B2 * | 11/2010 | Mons | ............ | B22F 3/1055 29/458 |
| 9,031,680 B2 * | 5/2015 | Napadensky | ............ | G06T 17/00 700/98 |
| 9,254,535 B2 * | 2/2016 | Buller | ............ | B23K 26/346 |
| 9,505,057 B2 | 11/2016 | Nordkvist et al. | | |
| 9,878,494 B2 * | 1/2018 | Hartmann | ............ | B29C 64/106 |
| 9,956,612 B1 | 5/2018 | Redding et al. | | |
| 2004/0141018 A1 * | 7/2004 | Silverbrook | ............ | B22F 3/008 347/4 |
| 2005/0012247 A1 | 1/2005 | Kramer et al. | | |
| 2005/0280185 A1 * | 12/2005 | Russell | ............ | B28B 1/001 264/308 |
| 2006/0127153 A1 * | 6/2006 | Menchik | ............ | B41J 2/175 400/62 |
| 2007/0183918 A1 | 8/2007 | Monsheimer et al. | | |
| 2010/0031882 A1 * | 2/2010 | Abe | ............ | B05C 19/04 118/620 |
| 2010/0090374 A1 * | 4/2010 | Dietrich | ............ | B22F 3/1055 264/497 |
| 2013/0073068 A1 | 3/2013 | Napadensky | | |
| 2013/0186514 A1 * | 7/2013 | Zhuang | ............ | B22F 1/0003 141/11 |
| 2014/0363585 A1 | 12/2014 | Pialot et al. | | |
| 2015/0054191 A1 * | 2/2015 | Ljungblad | ............ | B22F 3/004 264/112 |
| 2015/0071809 A1 * | 3/2015 | Nordkvist | ............ | B22F 1/0014 419/23 |
| 2016/0339639 A1 * | 11/2016 | Chivel | ............ | B33Y 10/00 |
| 2017/0057013 A1 | 3/2017 | Gillespie et al. | | |
| 2017/0072463 A1 * | 3/2017 | Ng | ............ | B29C 64/153 |
| 2017/0072643 A1 * | 3/2017 | Ng | ............ | B29C 64/20 |
| 2017/0072644 A1 * | 3/2017 | Ng | ............ | B33Y 30/00 |
| 2017/0165910 A1 * | 6/2017 | Dinardo | ............ | B33Y 10/00 |
| 2017/0173887 A1 * | 6/2017 | Sasaki | ............ | B29C 64/386 |
| 2017/0305142 A1 * | 10/2017 | Yamaguchi | ............ | B29C 64/165 |
| 2017/0312985 A1 * | 11/2017 | Talgorn | ............ | B33Y 80/00 |
| 2018/0015665 A1 * | 1/2018 | Kosugi | ............ | B33Y 70/00 |
| 2018/0222114 A1 * | 8/2018 | Ng | ............ | B29C 64/20 |
| 2018/0304302 A1 * | 10/2018 | Sachs | ............ | B22F 3/1055 |
| 2019/0077079 A1 * | 3/2019 | Susnjara | ............ | B29C 64/25 |

FOREIGN PATENT DOCUMENTS

| | | |
|---|---|---|
| CN | 204366039 | 6/2015 |
| JP | 2000-328106 | 11/2000 |
| JP | 2000336403 | 12/2000 |
| JP | 2016 107543 | 6/2016 |
| WO | WO 2005/089090 | 9/2005 |
| WO | WO 2012/073089 | 6/2012 |
| WO | WO 2015/082677 | 6/2015 |
| WO | WO 2016/007672 A1 | 1/2016 |

OTHER PUBLICATIONS

International Search Report and Written Opinion in International Application No. PCT/US2016/038251, dated Sep. 30, 2016, 11 pages.

Office Action in Chinese Application No. 201680035969.X, dated Apr. 11, 2019, 11 pages (with English Search Report).

Extended European Search Report in Application No. 16812590.4, dated Jan. 22, 2019, 16 pages.

* cited by examiner

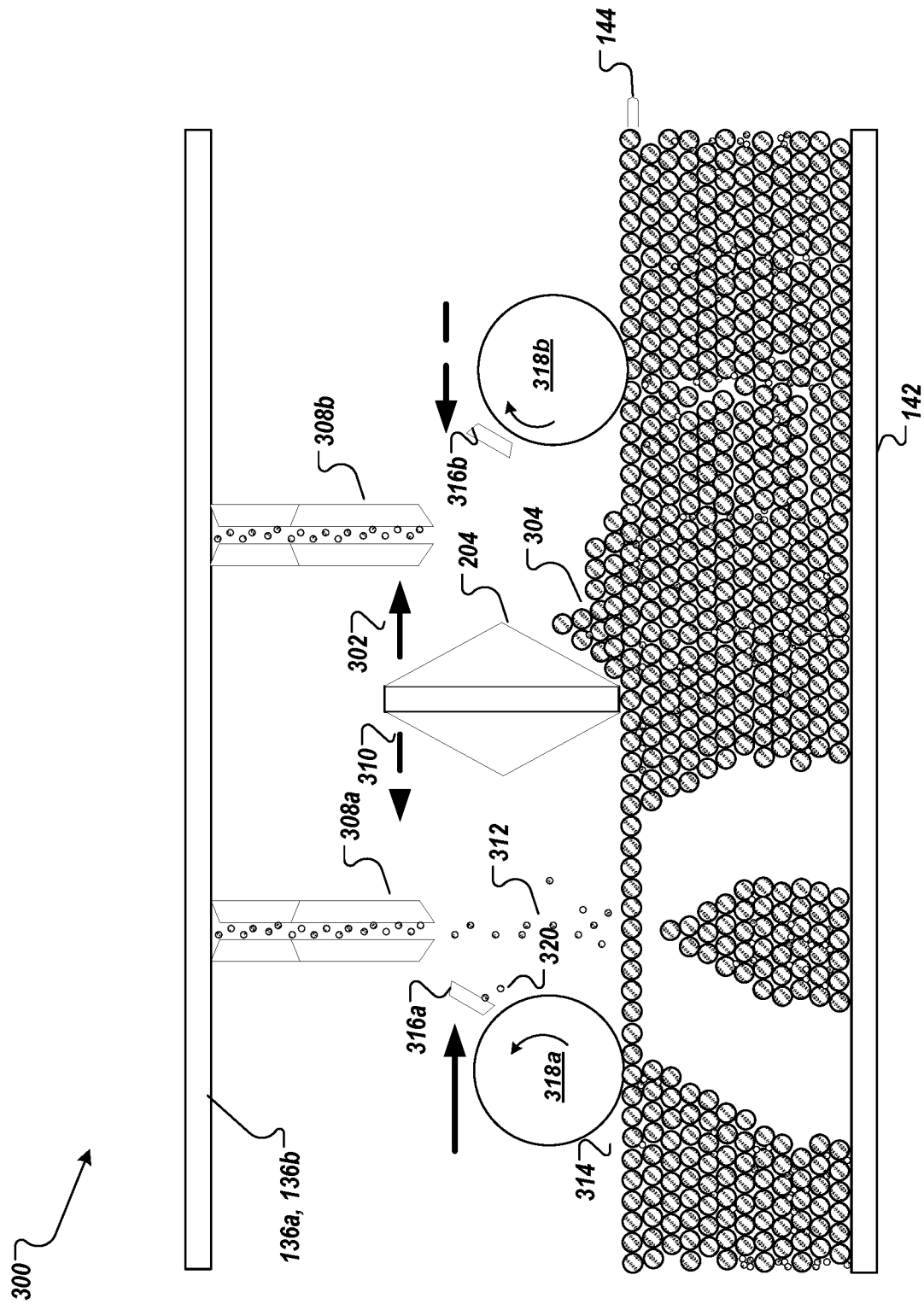

MATERIAL DISPENSING AND COMPACTION IN ADDITIVE MANUFACTURING

CROSS-REFERENCE TO RELATED APPLICATIONS

This application claims priority to U.S. Application Ser. No. 62/182,344, filed on Jun. 19, 2015, the entirety of which is incorporated by reference.

TECHNICAL FIELD

This specification relates to additive manufacturing, also known as 3D printing.

BACKGROUND

Additive manufacturing (AM), also known as solid freeform fabrication or 3D printing, refers to any manufacturing process where three-dimensional objects are built up from raw material (generally powders, liquids, suspensions, or molten solids) in series of two-dimensional layers or cross-sections. In contrast, traditional machining techniques involve subtractive processes and produce objects that are cut out of a stock material such as a block of wood, plastic or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains, e.g., powders. Sintering usually involves heating a powder. The powder used in sintering need not reach a liquid phase during the sintering process, in contrast to melting. When a powdered material is heated to a temperature below or close to the melting point in a sintering process, the atoms in the powder particles diffuse across the boundaries of the particles, fusing the particles together to form a solid piece. As the sintering temperature does not have to reach the melting point of the material, sintering is often used for materials with high melting points such as tungsten and molybdenum.

Conventional systems that use a laser beam as the energy source for sintering or melting a powdered material typically direct the laser beam on a selected point in a layer of the powdered material and selectively raster scan the laser beam to locations across the layer. Once all the selected locations on the first layer are sintered or melted, a new layer of powdered material is deposited on top of the completed layer and the process is repeated layer by layer until the desired object is produced.

An electron beam can also be used as the energy source to cause sintering or melting in a material. Once again, the electron beam needs to be raster scanned across the layer to complete the processing of a particular layer.

SUMMARY

In general, in one aspect, a method of additive manufacturing includes successively forming a plurality of layers on a support. Depositing a layer from the plurality of layers includes dispensing a layer of first particles on a support or an underlying layer, dispensing second particles onto the layer of first particles such that the second particles infiltrate into the layer of first particles, and fusing the first particle and second particles to form the layer from the plurality of layers. The first particles having a first mean diameter, and the second particles having a second mean diameter at least two times smaller than the first mean diameter.

Implementations can include one or more of the following features. Dispensing the layer of first particles can include pushing the first particles across the support or underlying layer, e.g., with a blade or a roller. Dispensing the layer of first particles can include ejecting the first particles from an aperture in the rotating roller. The first particles can be pushed from a powder delivery bed adjacent the support. Dispensing the second particles can include ejecting the second particles from a nozzle onto the layer of first particles. Ejecting the second particles can include spraying a carrier fluid containing the second particles. The fluid can evaporate.

Prior to fusing the first particles and the second particles, the layer of first particles having infiltrated second particles can be compacted. For example, a rotating roller can press on the layer of first particles having infiltrated second particles. The layer of first particles can be formed with a thickness between one to four times the first mean diameter. The second mean diameter can be at least four times smaller than the first mean diameter. The second mean diameter can be about 100 nm to 10 µm.

Before dispensing the layer of first particles, a layer of the third particles having a third mean diameter at least two times smaller than the first mean diameter can be dispensed. The layer of first particles can be dispensed onto the layer of third particles, and the first particle, the second particles and the third particles can be fused to form the layer from the plurality of layers.

Forming the plurality of layers can include forming a first layer and a second layer. Forming the first layer can include dispensing a first layer of first particles by pushing the first particles laterally with a first roller, dispensing the second particles onto the first layer of first particles, and compacting the first layer of first particles and second particles with a second roller, with the first roller and the second roller moving horizontally in a first direction. Forming the second layer can include dispensing a second layer of first particles by pushing the first particles laterally with the second roller, dispensing second particles onto the second layer of first particles, and compacting the second layer of first particles and second particles with the first roller, with the first roller and the second roller moving horizontally in a second direction opposite the first direction.

The first particles and second particles can be fused by applying a laser beam to the layer of the first particles and second particles. The first particles and the second particles can have the same material composition. Dispensing the second particles can include selectively controlling dispensing of the second particles on a layer by layer basis to provide layers of different density in a fabricated object, or controlling dispensing of the second particles within a layer to provide regions of different density within a layer of a fabricated object.

In another aspect, an additive manufacturing apparatus for forming a part includes a support, a first dispenser to deliver a layer of first particles on a support or an underlying layer on the support, a second dispenser to deliver second particles onto the layer of first particles such that the second particles infiltrate into the layer of first particles, an energy source to fuse the first particle and second particles to form a fused layer of the part and a controller coupled to the first dispenser, second dispenser and energy source.

Implementations can include one or more of the following features. The first dispenser may be configured to deliver the layer of first particles in a first region that spans the layer and is configured to move laterally in a first direction parallel to a surface of the support. The second dispenser may be configured to deliver the second particles in a second region that spans the layer and is configured to move laterally in the first direction. The first dispenser may include a roller or a blade to push the first particles laterally in a first direction parallel to a surface of the support. The first dispenser may include a powder delivery bed adjacent the support.

The second dispenser may include a nozzle or an array of nozzles to eject the second particles. Nozzles of the array may be independently controllable by the controller. A nozzle may be configured to spray a carrier fluid containing the second particles.

A roller may be positioned to compact the layer of first particles and second particles. The first dispenser may include a first roller to push the first particles laterally in a first direction parallel to a surface of the support, and the apparatus may include a second roller to compact the layer of first particles and second particles. A linear actuator may move the first roller and the second roller in the first direction. Motors may rotate the first roller and the second roller. The linear actuator may be configured to move the energy source with the first roller and the second roller. The first roller and the second roller may have the same diameter.

The controller may be configured to cause the linear actuator to move the first roller and the second roller in a second direction opposite the first direction during formation of a second layer of the part such that the second roller pushes first particles laterally in the second direction and the first roller compacts the first particles and the second particles of the second layer. The first roller may have a larger diameter than the second roller.

The energy source may be a laser. The apparatus may include an actuator to move the support vertically. The controller may be coupled to the actuator and be configured to cause the actuator to hold the support in a fixed vertical position during forming of the layer of the part. The controller may be configured to cause the second dispenser to selectively dispense the second particles on a layer by layer basis to provide layers of different density in a fabricated object. The controller may be configured to cause the second dispenser to selectively dispense the second particles within a layer to provide regions of different density within a layer of a fabricated object.

The first particles may have a first mean diameter, and the second particles having a second mean diameter at least two times smaller than the first mean diameter. The second mean diameter may be about 100 nm to 10 μm.

Particular embodiments of the subject matter described in this specification can be implemented to realize one or more of the following advantages. The layers of powdered material achieve increased physical compaction prior to fusing, which may reduce the physical shrinkage of the final layer. The dimensional accuracy of the fabricated parts may also be improved, and less stringent software and process compensation requirements may be necessary for multiple geometries. Multiple different materials may also be dispensed while simultaneously controlling the level of porosity of the powdered layers and other mechanical functionalities. Functional grading can be achieved by controlling the level of porosity or by the selective deposition of different materials from layer to layer, and for some implementations within a layer. The approach can be adaptable to a wide variety of primary particle composition and sizes with varied particle morphologies.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3A-3B illustrate an example process of bi-directional layering and compaction of second powder particles into a powder layer using a blade.

Like reference numbers and designations in the various drawings indicate like elements.

DETAILED DESCRIPTION

Powder particle size, binder viscosity, droplet size, and printing layer thickness are factors that determine the strength and surface quality of the 3D printing process. Powder size and the homogenous dispersion of the powder particles affect the 3D printing process. If the powder size is too small, because of powder flowability the powder will not be spread in thin layers, and the roller can overpress the powder.

The compaction, e.g. density, of powder layers prior to fusing by an energy source can assist in obtaining a desired structural integrity and dimensional accuracy for the printed part. Low powder compaction density can result in noticeable spatial shrinkage during the fusing process that can lead to poor dimensional accuracy in the fabricated part and effect the long-term structural integrity and aesthetics of the fabricated part.

Approaches to account for physical shrinkage, reduce porosity between fused layers, and obtain surface quality of the printed part present various challenges. Software compensation of the spatial shrinkage along the build plane can be employed to account for physical shrinkage. A thicker powder layer may also be used prior to fusing to compensate for vertical directional shrinkage. Similarly, physical shrinkage along XY build plane can be compensated via corrected (e.g. extending the physical dimensions) cross-sectional profiles of the part design. However, these approaches do not provide consistency when switching between materials due to geometric complexities.

Bi-modal or tri-modal distributed particles can be used to reduce porosity of fused layers. However, use of bi-modal or tri-modal distributed particles during the layering process presents powder flowability challenges because of particle aggregation. In particular, this problem can occur when a larger proportion of the distribution leans towards smaller particle sizes. By dispensing a layer of large particles onto a support, and then dispensing smaller particles onto the layer of larger particles, a layer with higher density can be achieved. In addition, selective densification of the layer can be obtained by selective deposition of the smaller particles.

Figure 1A:
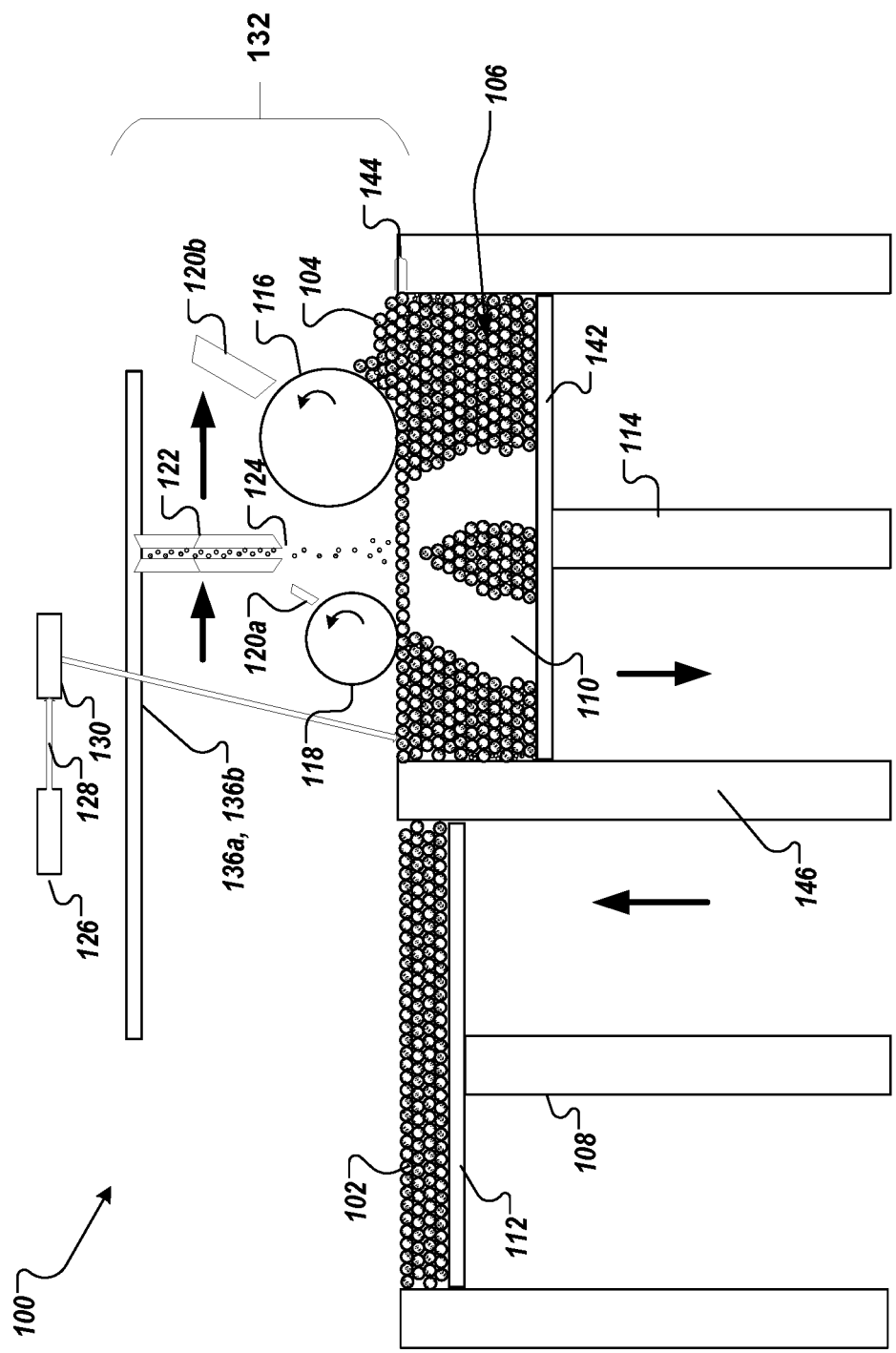
FIG. 1A illustrates an example additive manufacturing apparatus.

FIG. 1A shows an example additive manufacturing apparatus 100, e.g. a selective laser sintering system (SLS), selective laser melting (SLM) or an electron beam melting system. The additive manufacturing apparatus 100 includes a support 142 to hold a powder bed in which the object is fabricated, a powder delivery system 132 configured to deliver both a layer of first particles and to deliver smaller second particles onto the layer of first particles, and an energy source to generate sufficient heat to fuse the powder.

The support 142 can be connected to piston 114 that controls the vertical height of the support 142. After each layer of powder has been dispensed and fused, the piston 114 lowers the support 142 and any layers of powder thereon, by the thickness of one layer, so that the assembly is ready to receive a new layer of powder.

The powder delivery system includes a first dispenser to deliver a layer of first powder particles 104 onto the support 142 or a previously dispensed layer on the support 142, and a second dispenser to deliver smaller second powder particles 124 onto the outer layer of first powder particle 104. The successively deposited and fused layers of powder form a fabricated object 110.

Materials for the first powder particles 104 include metals, e.g. steel, aluminum, cobalt, chrome, and titanium, alloy mixtures, ceramics, composites, and green sand.

In some implementations, the first dispenser includes a powder delivery platen 112 to support a powder delivery bed 102 adjacent the support 142. A wall 146 can separate the powder delivery platen 112 and powder delivery bed 102 from the support 142 and fabrication powder bed 106. A powder delivery piston 108 controls the vertical motion of a powder delivery platen 112. The vertical motion of the powder delivery piston 108 controls the disbursement of the first powder particles 104 from the powder delivery bed 102. The powder delivery piston 108 moves the powder delivery platen 112 up vertically by a height that will provide sufficient powder particles to form a layer of uniform thickness over the support 142.

The first dispenser also includes a powder delivery device, e.g. a blade or a roller, to displace first powder particles 104 from the powder delivery bed 102 to the fabrication powder bed 106 to form a layer of powder material 144. For example, the blade or roller can push the powder from the powder delivery bed 102 across the fabrication powder bed 106 to form the layer of powder material 144.

Each layer of powder material can be a single particle thick, or each layer of powder material can have a thickness resulting from a stacking of multiple first powder particles 104. For example, each layer of powder material can have a thickness of approximately one to four times the mean diameter of a first powder particle.

The dispenser can include at least one roller to push the first powder particles 104. For example, in the implementation shown in FIG. 1A, the additive manufacturing apparatus 100 includes a main roller 116 and a secondary roller 118. The main roller 116 can be moved laterally, i.e., parallel to the surface of the support 142 and any layers of powder material on the support 142, to push first powder particles 104 from the powder delivery bed 102 to the fabrication powder bed 106 to form the outermost layer of powder material. The height of the main roller 116 above the top of the fabrication powder bed 106 can be set to deliver a desired thickness of the first powder material. The secondary roller 118 can compact dispensed second powder particles 124 into the voids of the layers of powder material. The process can be repeated if the final thickness is beyond a desired thickness, e.g., one to four times the mean diameter of a first powder particles.

In some implementations, one or both of the rollers have an active temperature control of the roller surface, e.g. by running a cooling agent across the internal core of the roller. The rollers can be made of metal, e.g. stainless steel, nickel alloys, titanium, or ceramic-coated metal. The rollers can have a surface roughness with an arithmetic mean (Ra) of approximately 0.05 µm-5 µm.

Optionally, in order to prevent the powder particles, e.g. first powder particles 104 or second powder particles 124, from sticking to the rollers, the first dispenser includes one or more blades, e.g., blades 120a and/or 120b, to clean one or more of the rollers, e.g., the main roller 116 and/or the secondary roller 118. The blade(s), when used to prevent powder particles from sticking to the roller(s), are positioned in close proximity to the rollers to effectively scrape any powder particles off the rollers as they rotate. The blades are approximately at a distance of less than the smallest diameter of the particles that are being dispensed, e.g. at a distance that is less than or equal to half the diameter of the smallest particles being dispensed.

Figure 2A:
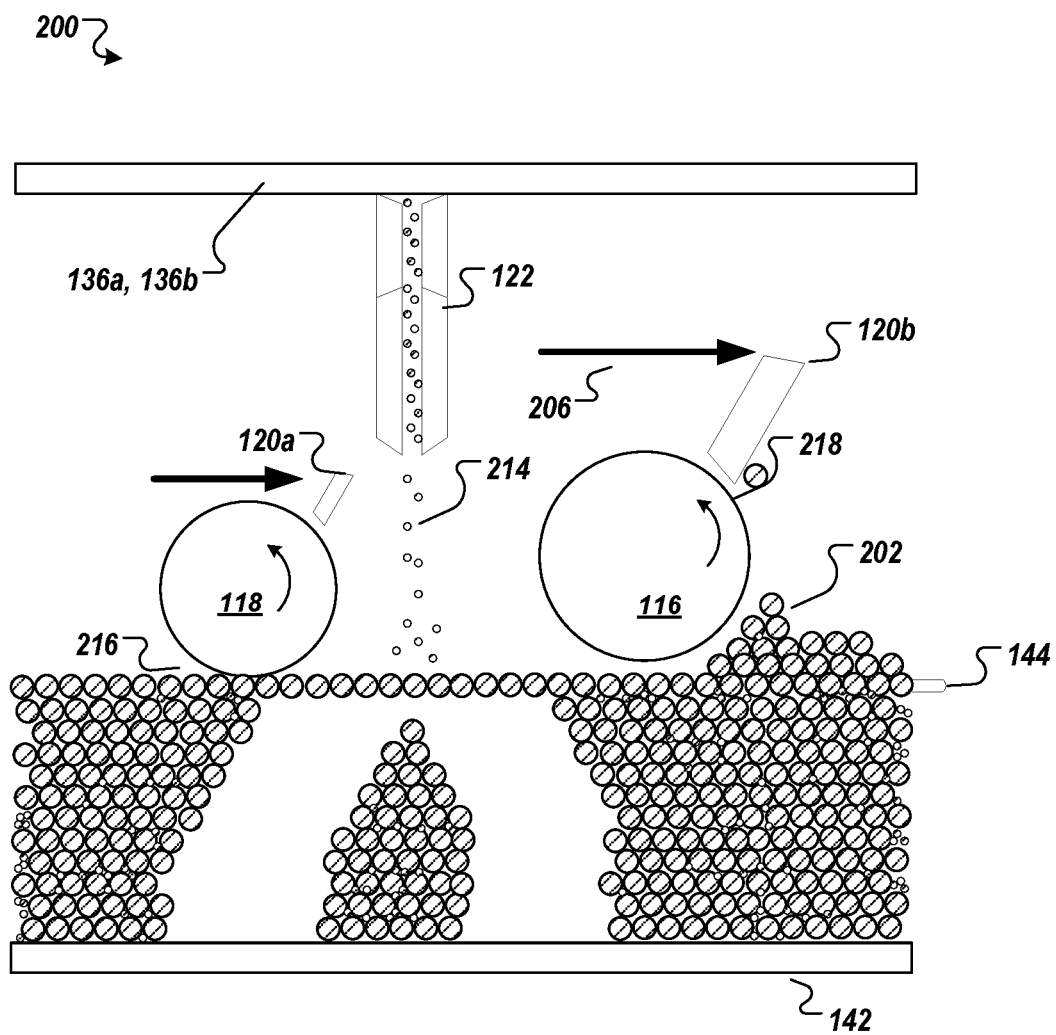
FIGS. 2A-2B illustrate an example process of dispensing and layering for introducing the second powder particles into a powder layer.
Figure 2B:
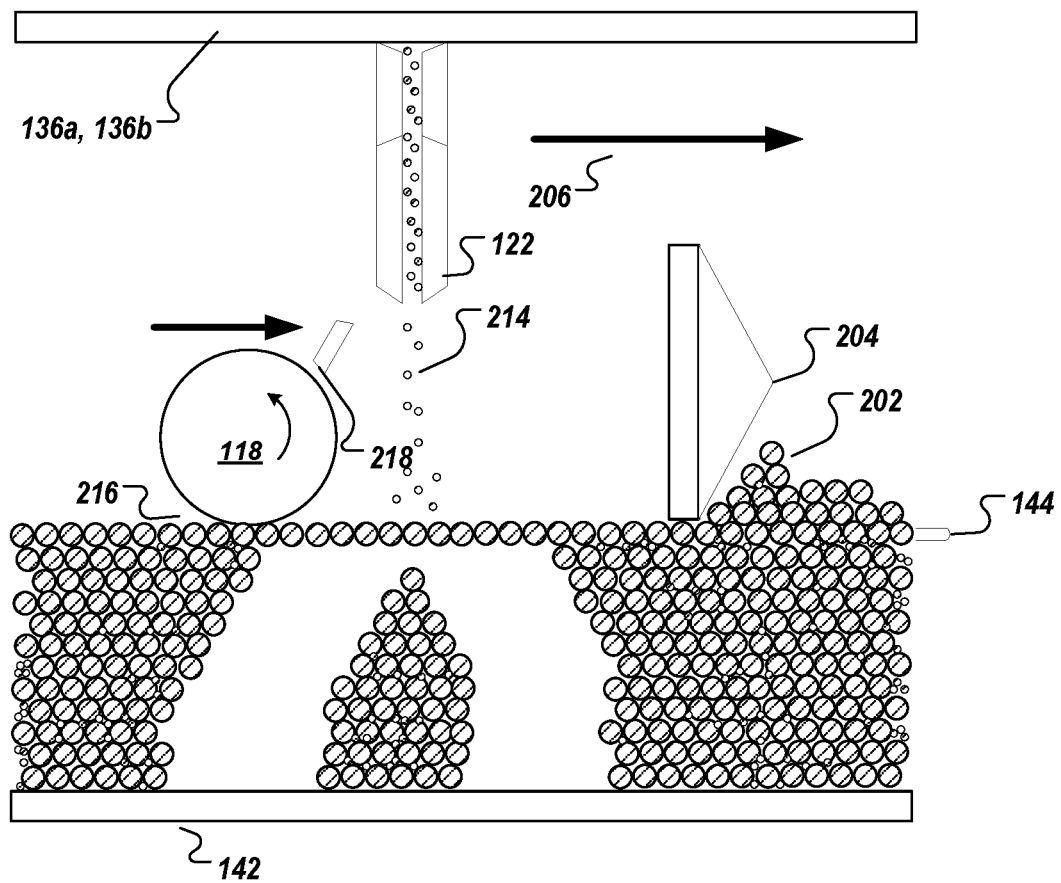

In some implementations, rather than a roller, a blade, e.g., a blade 204 as shown in FIG. 2B, is used to push powder particles from the powder delivery bed 102 to the fabrication powder bed 106 to form the layer of powder material. In other implementations, rather than pushing the powder from a dispensing bed adjacent the support, the first dispenser includes a dispensing array that is positionable over the support 142 and that ejects the particles from a nozzle. For example, the dispensing array can deliver the first powder particles in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer, e.g., prior to the second particles being dispensed. Alternatively, a dry dispensing mechanism, e.g., an array of nozzles assisted by ultrasonic agitation and pressurized inert gas, can be employed to dispense the first particles.

The second dispenser can include a dispensing array 122 to dispense second powder particles 124 onto the layer of first powder particles. Since the second powder particles are smaller, they can infiltrate the layer of first powder particle to fill voids in the powder layer.

The dispensing array 122 can be positionable above the fabrication powder bed 106. The dispensing array 122 can be digitally addressable. That is, the dispenser has a digitally addressable array head. The dispensing array 122 can deposit powder particles of different sizes, e.g., sub-micron particles or nano-particles, and different materials or deposit powder particles of the same size or same material.

The second powder particles 124 can have, for example, a mean diameter that is at least two times smaller, e.g., two to fifty times smaller, e.g., three to ten times smaller, than the mean diameter of the first powder particles 104. For example, the second powder particles 124 can have, for example, a mean diameter of 100 nm to 10 µm. The dispensing array 122 can include a micro-dispensing array head that ejects the second powder particles from a nozzle. For example, the dispensing array 122 can dispenses the second powder particles in a carrier fluid. The carrier fluid can be a high vapor pressure carrier, e.g., Isopropyl Alcohol (IPA), ethanol, or N-Methyl-2-pyrrolidone (NMP). The dispensing array 122 can remove the carrier fluid, e.g., using thermal evaporation or suction, prior to sintering of the layer. The dispensing array can be a dry dispensing mechanism that uses inert gas jets, e.g. argon, nitrogen, or mixed gases, and/or an ultrasonic agitation mechanism, to dispense the second powder particles.

The micro-dispensing array head can be controllable so that second powder particles infiltrate the layer of first powder particles. Thus, the second powder particles can fill the voids between first powder particles. As a result, the layer of combined first and second powder particles can have a higher density, and the fused material can similarly have a higher density.

In addition, by selectively controlling the locations to which the second powder particles are dispensed by the dispensing array 122, the density of the fabricated part can be controlled both layer to layer, and within a layer.

The micro-dispensing array ahead can have multiple nozzles with diameters between 1 µm and 500 µm. The nozzle heads can be made up of segmented nozzle heads laid out across the width of the fabrication powder bed. In other implementations, the micro-dispensing array uses a slot-based array head. The material dispenser can deposit the second powder particles at approximately a velocity of 0.1-30 m/s, and the dispenser can introduce the particles with or without a pulse frequency of 1-50 kHz.

The first and second powder particles can have the same material composition, but simply have different mean diameters. Alternatively, the first and second powder particles can be of different material composition. Possible materials for the second powder particles include those list above for the first powder particles. For some implementations, the first and second powder particles have the same composition. For some implementations, e.g., for forming a metal part, the first and second powder particles have the compositions that will combine to form a metal alloy or intermetallic material. The second powder particles can provide approximately 15-30% by volume of the layer of combined first and second powder particles.

The additive manufacturing apparatus 100 includes an energy source to create heat to fuse the layer of combined first and second powder particles. For example, the energy source can be a beam device 126 for emitting a directed energy beam 128, e.g., a laser or electron-beam. The laser includes a laser head, a safety shutter, and a mirror assembly. The additive manufacturing apparatus includes a laser control mechanism, e.g., a scanner system 130, that directs the energy beam 128 in the target area. The laser control mechanism operates to aim the energy beam 128 and to modulate the energy beam 128 to selectively fuse a layer of the powder material in the target area. The laser can be modulated on or off to selectively produce an energy beam 128 or the energy beam 128 can be continuous. To direct the aim of the energy beam 128, a mirror assembly is disposed of along the path of the energy beam. The mirror directs the energy beam at the powder material located on the support 142 in the fabrication powder bed 106 to fuse together the powder particles to form the fabricated object 110.

Alternatively or in addition, the energy source could include a lamp array to simultaneously heat the entire layer of combined first and second powder particles.

Figure 1B:
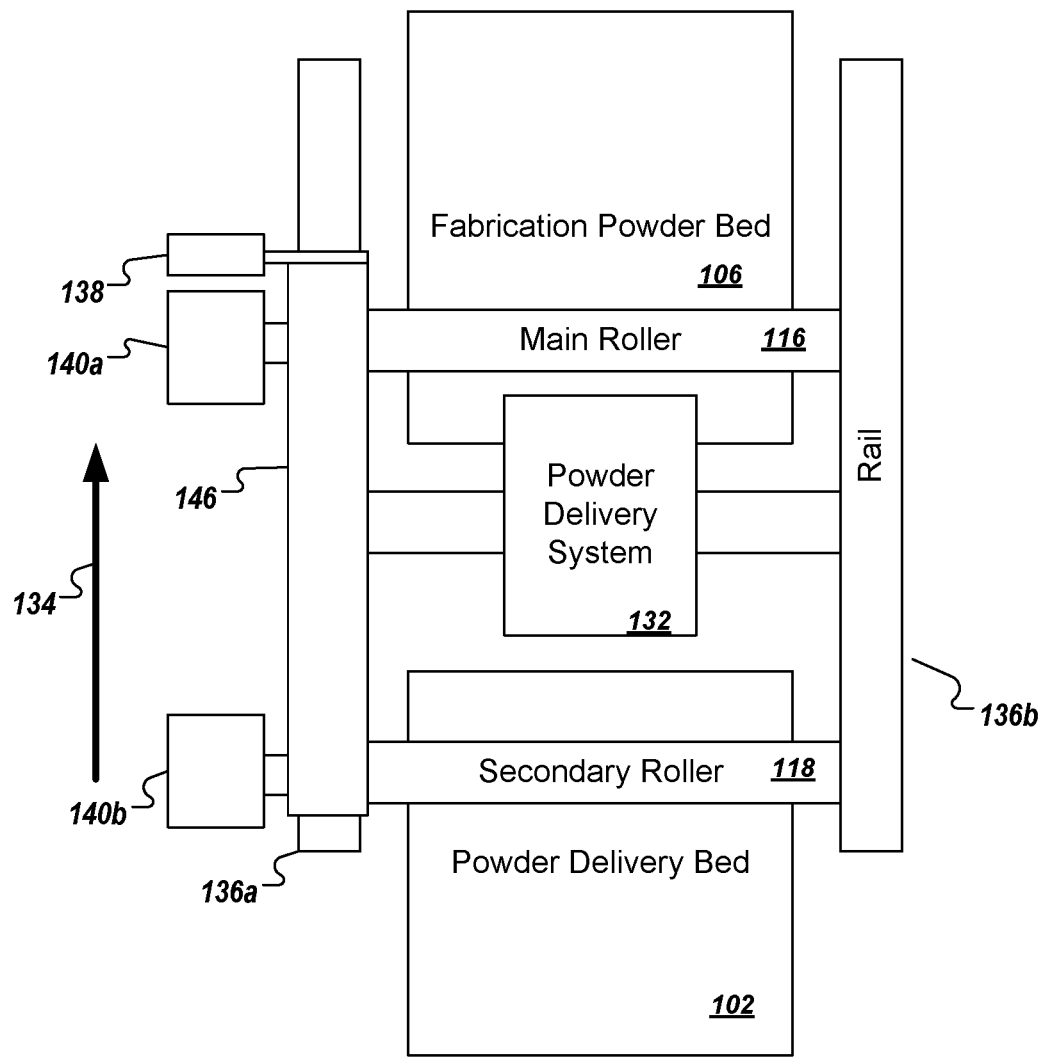
FIG. 1B illustrates a top view of the example additive manufacturing apparatus.

FIG. 1B shows an example top view of the additive manufacturing apparatus 100. A controller 138 controls a drive train, e.g. a linear actuator 146 and motors 140a and 140b, connected to the powder delivery system 132. The controller is configured to move the beam device, powder delivery system 132, and the rollers, e.g. main roller 116 and secondary roller 118, back and forth parallel to the top surface of the fabrication powder bed 106 (along the direction indicated by arrow 134) using the linear actuator 146. The motors 140a and 140b rotate the main roller 116 and secondary roller 118. For example, the powder delivery system 132 can be supported by rails, e.g., rails 136a and 136b.

FIG. 2A illustrates an example process of dispensing and layering for introducing the second powder particles into a powder layer. For example, an additive manufacturing apparatus, e.g. the additive manufacturing apparatus 100 of FIGS. 1A and 1B, can perform the process 200.

To form each layer, the apparatus pushes first powder particles having a first mean diameter across a support 142 or previously deposited layer on the support 142 to form a layer of the powder material 144 (step 202). The apparatus pushes the first powder particles using a main roller 116. Assuming the roller 116 is travelling left to right, the roller 116 can rotate in a counter-clockwise direction. The main roller 116 can be positioned at a height above the powder layer equivalent to the desired thickness, e.g., the height of a particle or a dual-micronized particle. The height can be approximately 12 µm-25 µm. The main roller 116 can traverse across the support 142 at approximately 0.1 m/s-10 m/s (along the direction indicated by arrow 206) and rotate at approximately 10 rpm-500 rpm to create a mono-particle or dual-particle thick layer.

In some implementations, the apparatus uses a blade, e.g. the blade 204 of FIG. 2B, instead of a main roller 116, to push first powder particles having a first mean diameter across the support 142 or previously deposited layer on the support 142. The blade 204 can have a front-facing knife-edge that is angled at approximately 5 degrees to 90 degrees to the surface of the support 142 and moves parallel to the surface of the support 142 so that a uniform mono-particle or dual particle layer is created.

In some implementations, prior to displacing the first powder particles to form a layer, the apparatus dispenses third powder particles onto the platen or underlying previously dispensed layer. This third powder particles can provide a thin layer onto which the first powder particles are dispensed. The third powder particles having a mean diameter that is at least two times smaller than the first mean diameter. This permits the first powder particles to settle into the layer of third powder particles. This technique can increase the density of the object at the bottom of the layer of first powder particles, e.g., if the second powder particles cannot infiltrate to the bottom of the layer of first powder particles.

Figure 5A:
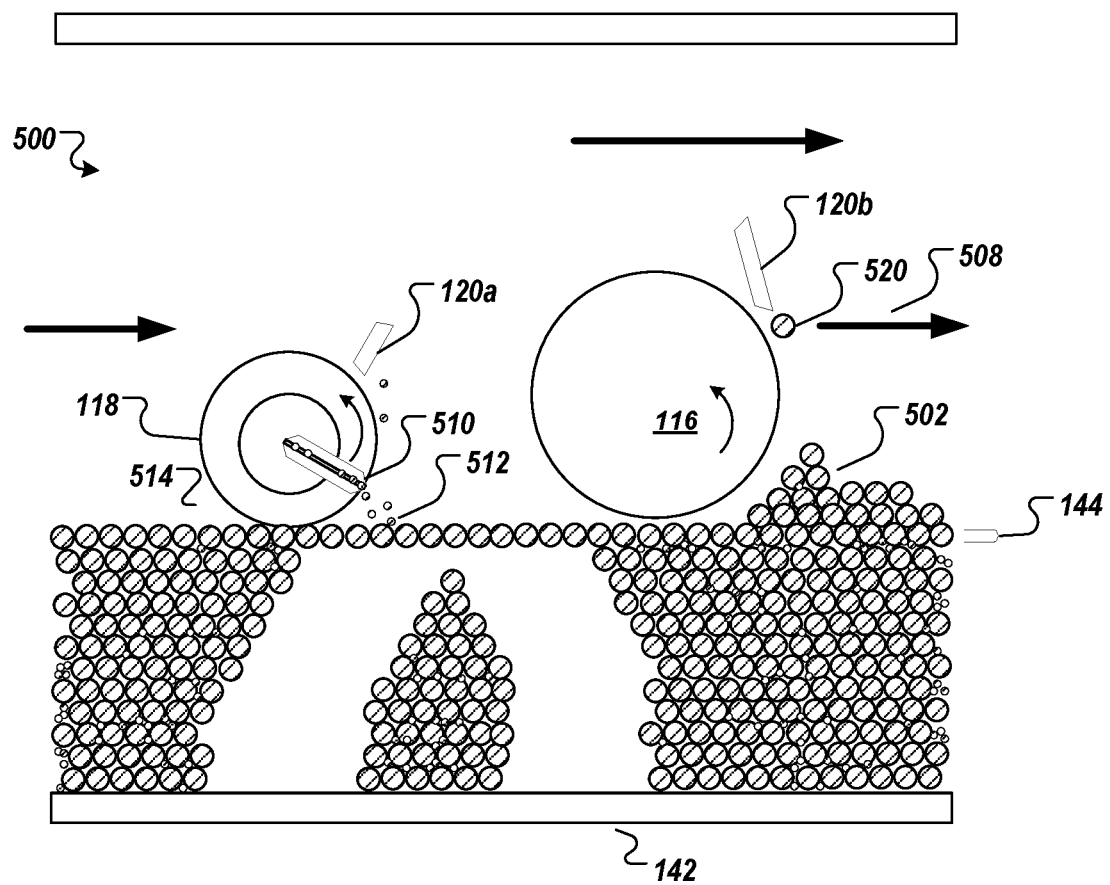
FIGS. 5A-5C illustrate an example process of performing layering and compaction of powder particles using one or more rollers integrated with a dispensing nozzle.
Figure 5B:
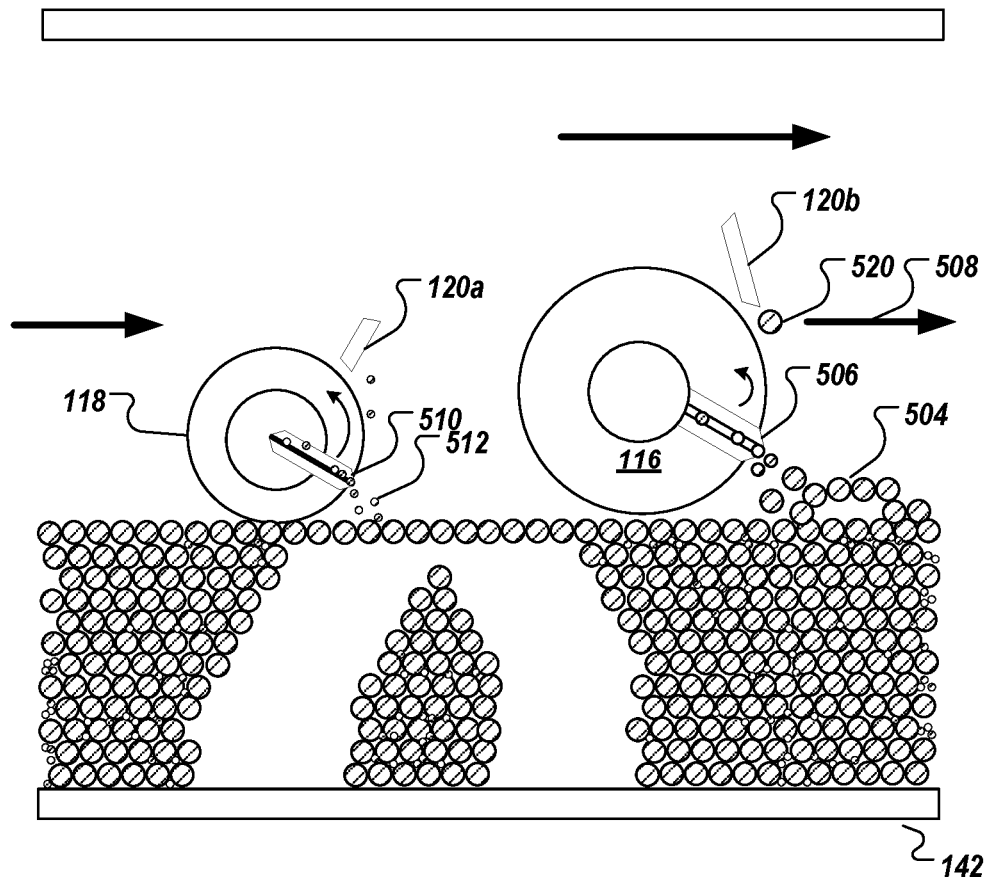

In some implementations, the apparatus dispenses first powder particles having a first mean diameter to form layers of the powder material using a dispensing array 122 integrated into the main roller 116, as shown in FIG. 5B. An integrated dispensing array is further described below with reference to FIGS. 5A-5C.

The apparatus dispenses second powder particles, e.g. submicron or nano-particles, having a second mean diameter using a dispensing array 122, e.g., a micro-dispensing array head, onto the layer of first powder material (step 214). The dispensed second powder particles infiltrate the layer of powder material. The dispensing array 122 is positioned behind the main roller 116 or blade 204 so that the dispensing array 122 follows the main roller 116 or blade 204 as it traverses across the layer of first powder material. The dispensing array 122 is not in contact with the layer of first powder material.

In some implementations, the second dispenser dispenses the second powder particles after the entire layer of first powder material has been delivered over the support 142. Alternatively, in some implementations, the second dispenser dispenses the second powder particles to a region of the layer of first powder material that has been dispensed, but while the first dispenser is still delivering the first powder material over another region of the support 142. For example, the micro-dispensing array head 122 can trail behind the main roller 116 or blade 204. In some implementations, the dispensing array 122 can be integrated into a secondary roller 118, as shown in FIGS. 5A-5B. An integrated dispensing array is further described below in FIGS. 5A-5C.

Optionally, the apparatus compacts the dispensed second powder particles (step 216) to fill voids in the layer of powder material. For example, the apparatus can use a secondary roller 118 that can be of the same size as the main roller 116 or can be smaller than the main roller 116. Assuming the secondary roller 118 is travelling left to right, the roller 118 can rotate counter-clockwise. In addition to compaction, this can also push any excess amount of second powder particles off the combined layer. The second roller can be positioned approximately 0.1 µm-0.1 µm above or below waterline of the main roller 116, depending on the degree of compaction required, to provide leveling of the powder layer. The secondary roller 118 traverses a path that follows the main roller 116 and the dispensing array.

The apparatus prevents particles from sticking onto the rollers using blades 120a and 120b that are positioned in close proximity to the main roller 116 and secondary rollers 118 (step 218). The proximity of the blades 120a and 120b is approximately a distance that is at least less than the smallest diameter of the particles, e.g. a gap less than or equal to half the diameter of the smallest particles being dispensed. The apparatus uses the blades 120a and 120b to scrape-off, clean, or prevent particles from sticking onto the rollers.

The apparatus fuses the layer of powder material provided by the compacted first and second powder particles. If there is a layer of third powder particles, the apparatus fuses the layer of powder material provided by the first, second and third powder particles.

Figure 3B:
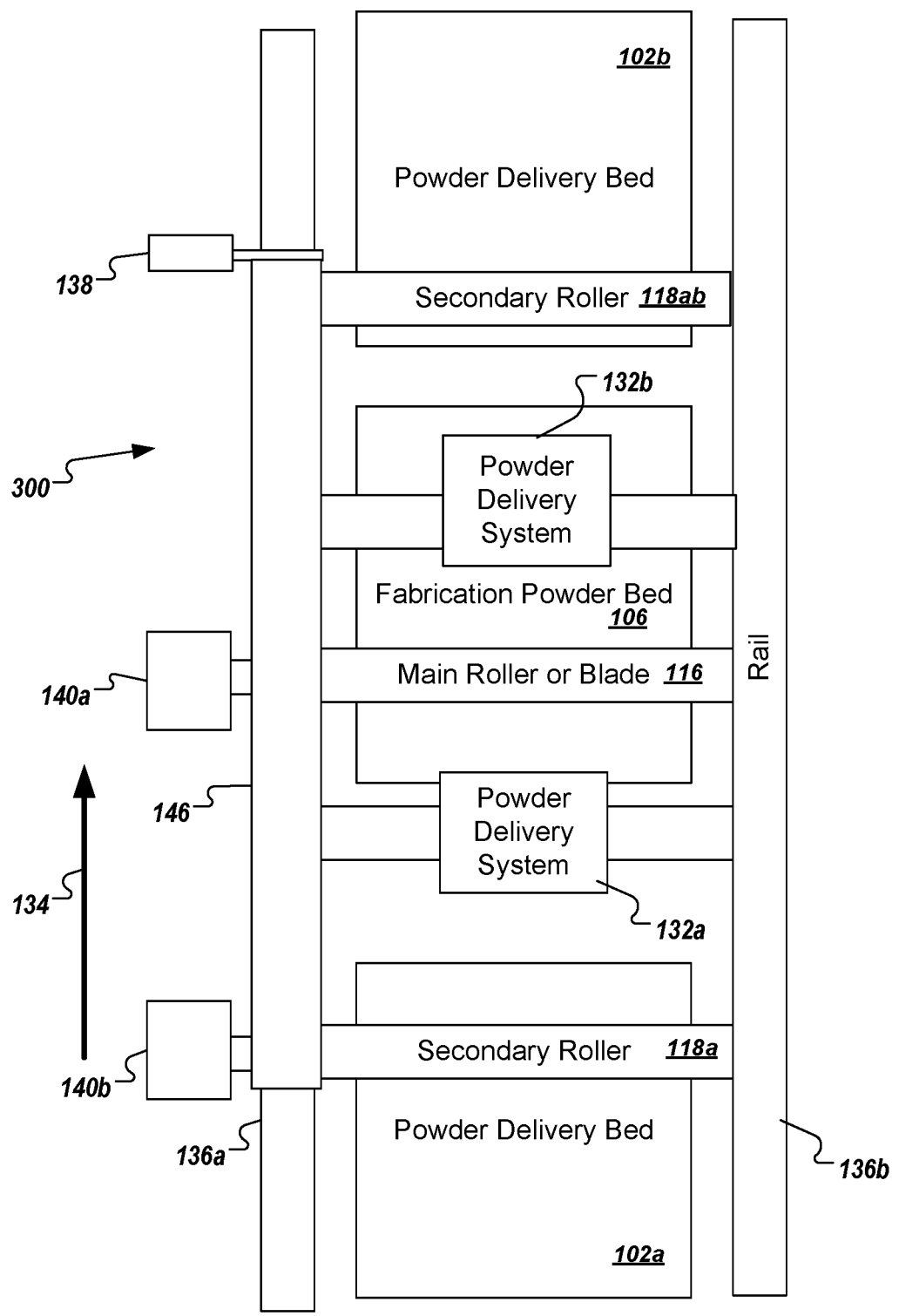

FIGS. 3A and 3B illustrate an apparatus 300 that can perform an example process of bi-directional layering and compaction of second powder particles into a powder layer. This additive manufacturing apparatus is similar to the additive manufacturing apparatus 100 of FIGS. 1A and 1B, but includes dispensing arrays 308a, 308b positioned on both sides of the primary roller or blade 204. Optionally, the apparatus can also include secondary rollers 318a, 318b, on both sides of the primary roller or blade 204. Assuming that the first dispenser uses a powder bed, the system can include powder delivery beds 102a, 102b positioned on both sides of the primary roller or blade 204.

The apparatus can traverse in a forward direction (along the direction of arrow 302) and push first powder particles having a first mean diameter from the powder delivery bed 102a across a support 142 or previously deposited layer on the support 142 to form a layer of the powder material 144 (step 304). The apparatus pushes the first powder particles using a roller or blade 204. Alternatively or in addition, the apparatus can dispense the first powder particles through slots or nozzles in the roller or blade 204.

The dispensing array 308a, 308b for the second powder particles and the secondary rollers 318a, 318b resides on each side of the roller or blade 204, e.g., a forward dispensing array 308a that trails the roller or blade 204 when the roller or blade traverses layer of powder materials in a forward direction (along the direction of arrow 302) and a back dispensing array 308b that trails the roller blade 204 when travelling in the opposite direction (along the direction of arrow 310). The secondary roller 318a or 318b can be the same kind of roller as secondary roller 118 as shown in FIG. 1A, and the dispensing arrays 308a and 308b can be the same kind of dispensing array as the dispensing array 122 as shown in FIG. 1A. The dispensing array for the second powder particles resides in between the secondary rollers 318a or 318b and the blade 204 on each side of the blade.

The apparatus dispenses the second powder particles using the dispensing array that trails the roller or blade (step 312). For example, assuming that the roller or blade 204 is travelling left-to-right, the dispensing array 308a can be used to deliver the second powder particles. The apparatus compacts the second powder particles using the trailing secondary roller 318a or 318b and smoothens the top surface of the powder layer in the respective direction (step 314). For example, again assuming that the roller or blade 204 is travelling left-to-right, the secondary roller 318a can be used to smooth and/or compact the combined layer of first and second powder particles.

The apparatus then changes direction and repeats the above process using the other dispensing array and other secondary roller that now trails the roller or blade as the apparatus moves in the opposite direction. For example, assuming that the roller or blade 204 is travelling right-to-left, the roller or blade 204 can push first powder particles having a first mean diameter from the powder delivery bed 102b across the support 142 or previously deposited layer on the support 142, the dispensing array 308b can be used to deliver the second powder particles, and the optional secondary roller 318b can be used to smooth and/or compact the combined layer of first and second powder particles.

The apparatus can prevent particles from building up on the rollers (step 320) using blades 316a and 316b.

Figure 4:
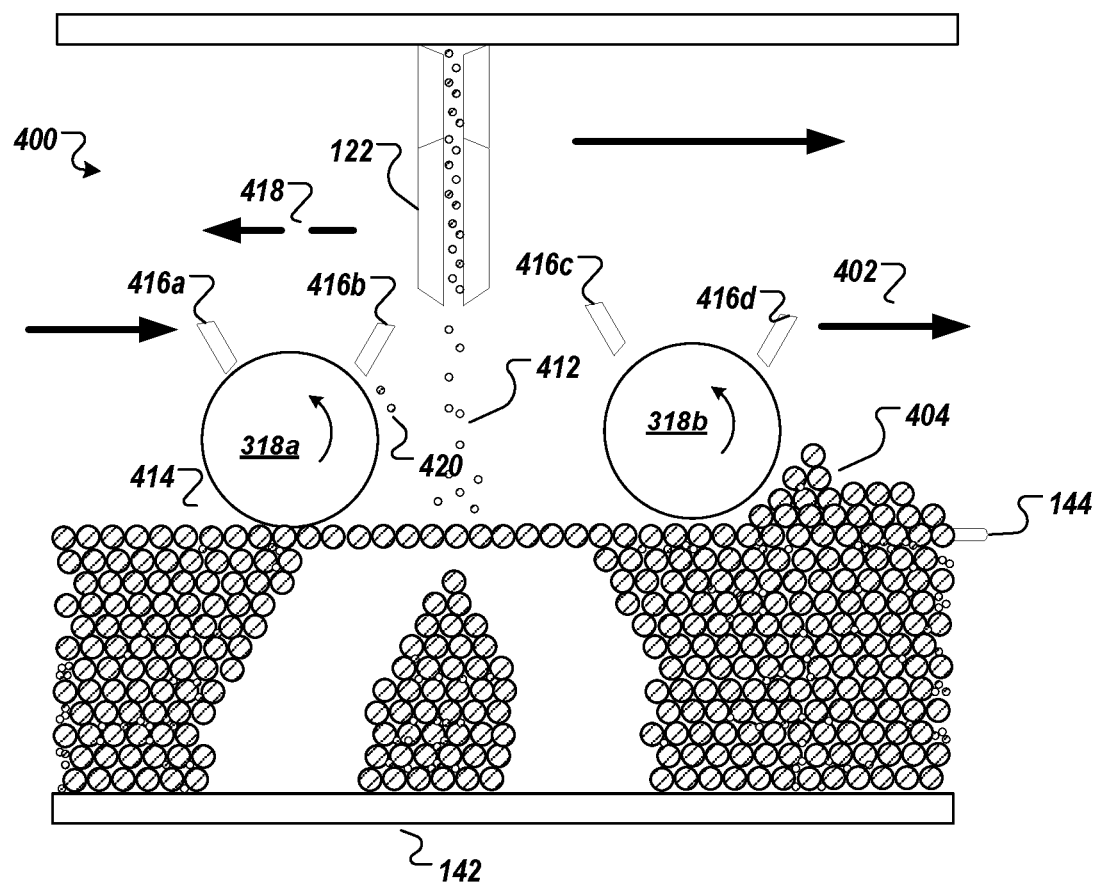
FIG. 4 illustrates an example process of bi-directional layering and compaction of second powder particles into a powder layer using a pair of secondary rollers.

FIG. 4 illustrates an example apparatus and process of bi-directional layering and compaction of second powder particles into a powder layer using a pair of secondary rollers. This additive manufacturing apparatus is similar to the additive manufacturing apparatus 100 of FIGS. 1A and 1B, but includes only a single dispenser 122 and two rollers 318a and 318b. For example, an additive manufacturing apparatus, e.g. the additive manufacturing apparatus 100 of FIGS. 1A and 1B, can perform the process 400.

The apparatus traverses in a forward direction (along the direction of arrow 402) and pushes first powder particles having a first mean diameter across a support 142 or previously deposited layer on the support 142 to form layers of the powder material 144 (step 404). The apparatus has a secondary roller 318a, 318b on each side of a dispensing array 122. The apparatus uses the leading secondary roller to push the first powder particles. The leading secondary roller is positioned ahead of the dispensing array 122, whereas, the trailing secondary roller is positioned behind the dispensing array 122 and follows the path traversed by the dispensing array 122. For example, assuming the rollers are travelling left-to-right, the secondary roller 318b is the leading secondary roller and can be used to push the first powder particles to form layers of the powder material. If the rollers are travelling right-to-left, the secondary roller 318a is the leading secondary roller and can be used to push the first powder particles.

The apparatus dispenses the second powder particles (step 412) using the dispensing array 122. The apparatus compacts the second powder particles (step 414) using the trailing secondary roller that follows the dispensing array 408. For example, again assuming that the rollers are travelling left-to-right, the secondary roller 318a can be used to compact and/or smoothen the layer of powder material 144, and if the rollers are travelling right-to-left the secondary roller 318b can be used to compact and/or smoothen the layer of powder material 144.

The apparatus can prevent particles from building up on the rollers (step 420) using blades 416a, 416b, 416c, and 416d.

The apparatus then traverses in the opposite direction (along the direction of arrow 418). For example, if the rollers were previously travelling from left-to-right the rollers switch directions and travel from right-to-left.

Blades could be substituted for the two rollers 318a and 318b.

Figure 5C:
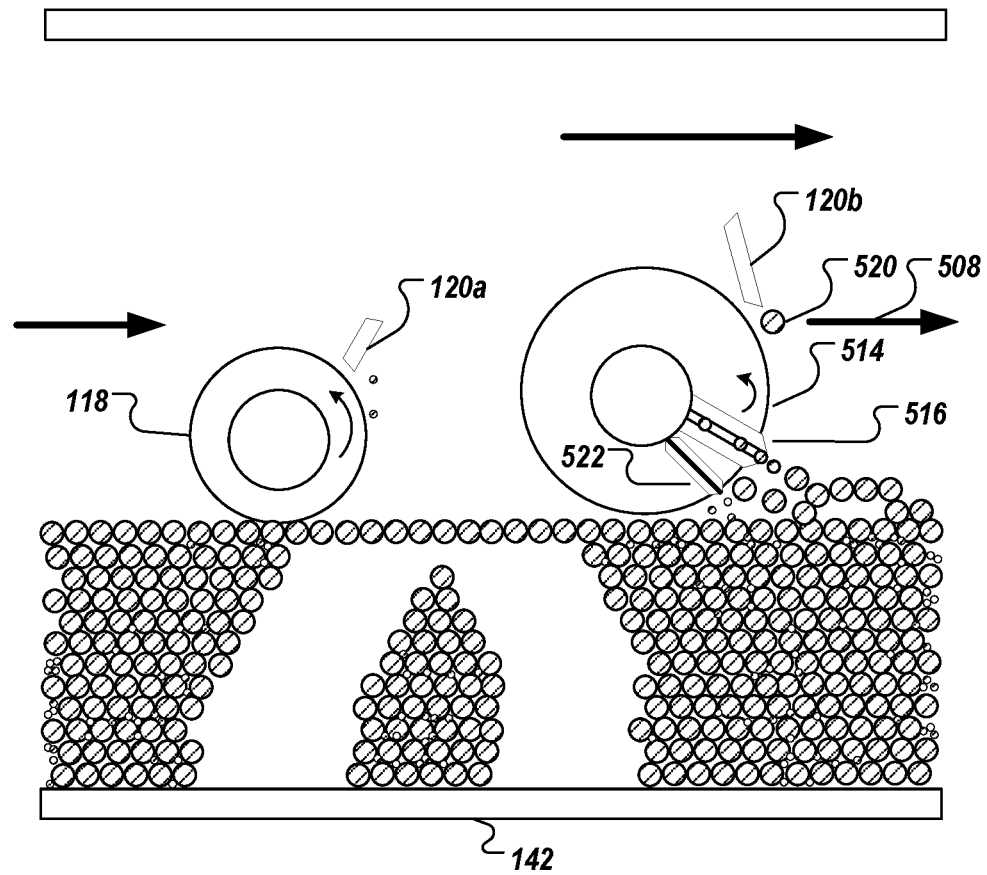

FIGS. 5A-5C illustrate an example process of performing layering and compaction of powder particles using one or more rollers integrated with a dispenser. For example, an additive manufacturing apparatus, e.g. the additive manufacturing apparatus 100 of FIGS. 1A and 1B, can perform the process 500.

The apparatus pushes first powder particles having a first mean diameter across a support 142 or previously deposited layer on the support 142 to form a layer of powder material 144 (step 502). The apparatus pushes the first powder particles using a main roller 116. The main roller 116 traverses in a forward direction (along a direction of arrow 508). Assuming the main roller 116 is travelling left-to-right, the main roller 116 can rotate in a counter-clockwise direction. In some implementations, the apparatus does not push the first powder particles across the platen to form layers of the powder material. Instead, the apparatus dispenses the first powder particles through an aperture (step 504), e.g. an integrated dispensing array 506 or integrated nozzle, in the main roller 116 as shown in FIG. 5B.

The apparatus dispenses second powder particles having a second mean diameter through an aperture, e.g., using a dispensing array 510 that is integrated into the secondary roller 118. The secondary roller 118 follows the main roller as it traverses across the layers of powder material and compacts and/or smoothens the layer of powder material 144 (step 518). For example, assuming the rollers are travelling left-to-right the secondary roller 118 compacts and/or smoothens the layer of powder material 144.

The integrated dispensing array 510, e.g. a nozzle or screw feeder, can be in contact with the powder layer as it dispenses the second powder particles.

When main roller 116, dispenses the first powder particles, e.g., through an integrated dispensing array 506 or aperture, and the secondary roller 118 dispenses the secondary powder particles, e.g., through an aperture or an integrated dispensing array 510 as shown in FIG. 5B, the apparatus appropriately times the dispensing of the first powder particles so that the first powder particles are dispensed before the second powder particles at each rotational segment of the layering process. In other implementations, a dual-core-shell roller 514 includes an inner core 516 that delivers the first powder particle and an external cladding mechanism 522 that dispenses the second powder particles, as shown in FIG. 5C. An array of these rollers can be further implemented when multi-materials are required during the layering process.

The apparatus can also contain the dispensed particles within a deposited region using a capture shield, and prevent particles from building up on the rollers (step 520) using blades 120a and 120b.

The rollers or blades 116, 118, 204 and dispensing arrays 122 are illustrated can be supported on a single assembly that moves on the rails 136a, 136b as a unit, or each component can be separately slidably attached to the rails 136a, 136b and be independently movable by its own actuator. The dispensing arrays 122 can alternatively be mounted/attached to robotic arms for placement of secondary particle powders at designated locations on the powder bed.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made. Accordingly, other implementations are within the scope of the claims.

What is claimed is:

1. An additive manufacturing apparatus for forming a part, comprising:
    a support;
    a powder delivery system including
        a first dispenser having a first aperture positioned above the support to deliver first particles over the support;
        a second dispenser having a second aperture positioned above the support and spaced from the first dispenser along a first axis to deliver second particles over the support;
        a third dispenser having a third aperture positioned above the support and spaced from the first dispenser along the first axis to deliver second particles over the support, the third dispenser positioned on an opposite side of the second dispenser from the first dispenser, and
        an actuator to move the powder delivery system including the first dispenser, the second dispenser, and the third dispenser laterally along the first axis parallel to a surface of the support such that the first aperture, the second aperture, and the third dispenser move across the surface of the support together;

an energy source to fuse the first particle and second particles to form a fused layer of the part; and a controller coupled to the first dispenser, second dispenser, third dispenser, actuator and energy source, the controller configured to alternately i) cause the actuator to move the first dispenser, second dispenser and third dispenser along the first axis in a first direction and to cause the first dispenser to deliver the first particles in a first layer and the second dispenser to deliver the second particles onto the first layer of first particles simultaneous with motion in the first direction such that the second particles infiltrate into the first layer of first particles, and ii) cause the actuator to move the first dispenser, second dispenser and third dispenser along the first axis in a second direction opposite to the first direction and to cause the first dispenser to deliver the first particles in a second layer and the third dispenser to deliver the second particles onto the second layer of first particles simultaneous with motion in the second direction such that the second particles infiltrate into the second layer of first particles.

2. The apparatus of claim 1, wherein the second dispenser is configured to deliver the second particles in a second region that spans the layer of first particles.

3. The apparatus of claim 1, wherein the second dispenser comprises a nozzle to eject the second particles.

4. The apparatus of claim 3, wherein the second dispenser comprises an array of nozzles to eject the second particles, wherein nozzles of the array are independently controllable by the controller.

5. The apparatus of claim 3, wherein the nozzle is configured to spray a carrier fluid containing the second particles.

6. The apparatus of claim 1, wherein the actuator is configured to move the energy source with the first dispenser and the second dispenser.

7. The apparatus of claim 1, wherein the energy source comprises a laser.

8. The apparatus of claim 1, wherein the controller is configured to cause the second dispenser to selectively dispense the second particles on a layer by layer basis to provide layers of different density in a fabricated object.

9. The apparatus of claim 1, wherein the controller is configured to cause the second dispenser to selectively dispense the second particles within a layer to provide regions of different density within a layer of a fabricated object.

10. The apparatus of claim 1, comprising a first reservoir holding the first particles to supply the first particles to the first dispenser and a second reservoir holding the second particles to supply the second particles to the second dispenser, and a third dispenser holding the first particles to supply the first particles to the third dispenser, wherein the first particles have a first mean diameter, and wherein the second particles have a second mean diameter at least two times smaller than the first mean diameter.

11. The apparatus of claim 10, wherein the second mean diameter is about 100 nm to 10 µm.

12. The apparatus of claim 1, wherein the first dispenser comprises a nozzle to eject the first particles.

13. The apparatus of claim 12, wherein the first dispenser comprises an array of nozzles to eject the first particles, wherein nozzles of the array are independently controllable by the controller.

14. The apparatus of claim 1, comprising a roller to compact the layer of first particles and second particles.

15. An additive manufacturing apparatus for forming a part, comprising:

a support;

a powder delivery system including a first dispenser having a first aperture positioned above the support to deliver a layer of first particles on a support or an underlying layer on the support, wherein the first dispenser comprises a first roller having the first aperture integrated therein, and a second dispenser having a second aperture positioned above the support and spaced from the first dispenser along a first axis to deliver second particles onto the layer of first particles such that the second particles infiltrate into the layer of first particles, wherein the second dispenser comprises a second roller having the second aperture integrated therein, and an actuator to move the powder delivery system including the first dispenser and the second dispenser laterally along the first axis parallel to a surface of the support such that the first aperture and the second aperture move across the surface of the support together while simultaneously delivering the first particles and the second particles, respectively;

an energy source to fuse the first particles and second particles to form a fused layer of the part; and a controller coupled to the first dispenser, second dispenser and energy source.

* * * * *